United States Patent
Doerndorfer

(10) Patent No.: US 10,008,869 B2
(45) Date of Patent: Jun. 26, 2018

(54) SUPPLY NETWORK COMPONENT FOR A SUPPLY NETWORK

(71) Applicant: Ropa Development GmbH, Schwaebisch Gmuend (DE)

(72) Inventor: Johannes Doerndorfer, Schwaebisch Gmuend (DE)

(73) Assignee: UNICORN ENERGY GMBH, Schwabisch Gmuend (DE)

( * ) Notice: Subject to any disclaimer, the term of this patent is extended or adjusted under 35 U.S.C. 154(b) by 430 days.

(21) Appl. No.: 14/471,820

(22) Filed: Aug. 28, 2014

(65) Prior Publication Data
US 2015/0042285 A1 Feb. 12, 2015

Related U.S. Application Data

(63) Continuation of application No. PCT/EP2013/054194, filed on Mar. 1, 2013.

(30) Foreign Application Priority Data

Mar. 2, 2012 (DE) .................. 10 2012 101 800

(51) Int. Cl.
*H02J 7/00* (2006.01)
*H01M 2/10* (2006.01)
(Continued)

(52) U.S. Cl.
CPC ........... *H02J 7/0042* (2013.01); *H01M 2/105* (2013.01); *H01M 2/1077* (2013.01);
(Continued)

(58) Field of Classification Search
CPC .................................................. Y02E 60/12
(Continued)

(56) References Cited

U.S. PATENT DOCUMENTS

| 5,852,353 A | 12/1998 | Kochanneck |
| 6,346,670 B1 * | 2/2002 | Fujii .................. H02J 7/35 |
| | | 136/244 |

(Continued)

FOREIGN PATENT DOCUMENTS

| DE | 19615943 A1 | 10/1997 |
| DE | 102006043831 A1 | 3/2008 |

(Continued)

OTHER PUBLICATIONS

International Search Report for application No. PCT/EP2013/054194, dated Oct. 2, 2013, 3 pages—translated.

(Continued)

*Primary Examiner* — Yalkew Fantu
(74) *Attorney, Agent, or Firm* — Reising Ethington, P.C.

(57) ABSTRACT

The present invention relates to a supply network component for a supply network for a network medium, comprising at least one contact unit for contacting a further supply network component of the supply network, a functional group having at least one functional unit, and at least one coupling unit for coupling the at least one contact unit to the functional group, wherein the at least one contact unit has a communication interface for communicating with a further supply network component of the supply network and a transport interface for transporting the network medium to a further supply network component. The present invention furthermore relates to an energy storage block comprising a plurality of the proposed supply network components.

28 Claims, 12 Drawing Sheets

(51) Int. Cl.
    *H01M 10/42* (2006.01)
    *H01M 10/46* (2006.01)
    *H01M 10/48* (2006.01)
    *B60L 11/18* (2006.01)

(52) U.S. Cl.
    CPC ......... *H01M 10/425* (2013.01); *H01M 10/46* (2013.01); *H01M 10/482* (2013.01); *B60L 11/1822* (2013.01); *B60L 11/1844* (2013.01); *H01M 2010/4271* (2013.01); *H01M 2010/4278* (2013.01); *H01M 2220/10* (2013.01); *H01M 2220/20* (2013.01); *Y02E 60/721* (2013.01); *Y02T 10/7072* (2013.01); *Y02T 90/121* (2013.01); *Y02T 90/124* (2013.01); *Y02T 90/128* (2013.01); *Y02T 90/14* (2013.01); *Y02T 90/16* (2013.01); *Y02T 90/163* (2013.01); *Y04S 10/126* (2013.01)

(58) Field of Classification Search
    USPC ........................................................ 320/127
    See application file for complete search history.

(56) References Cited

U.S. PATENT DOCUMENTS

| | | | | |
|---|---|---|---|---|
| 7,688,036 | B2* | 3/2010 | Yarger | ................ H01M 6/5033 320/137 |
| 2007/0188130 | A1 | 8/2007 | Scheucher | |
| 2010/0141202 | A1 | 6/2010 | Spies et al. | |
| 2011/0163603 | A1 | 7/2011 | Chou et al. | |
| 2011/0248668 | A1* | 10/2011 | Davis | ................... H01M 10/48 320/106 |
| 2012/0059532 | A1 | 3/2012 | Reifenhauser et al. | |

FOREIGN PATENT DOCUMENTS

| | | | |
|---|---|---|---|
| DE | 102006047654 A1 | 4/2008 | |
| DE | 102006055883 B4 | 6/2009 | |
| DE | 102008050437 A1 | 4/2010 | |
| DE | 102009003173 A1 | 11/2010 | |
| DE | 102010025959 A1 | 7/2011 | |
| DE | 102010027854 A1 | 10/2011 | |
| DE | 102010023049 A1 | 12/2011 | |
| EP | 2343752 A2 | 7/2011 | |
| EP | 2343752 A3 | 10/2011 | |
| EP | 2495802 A2 | 9/2012 | |
| WO | WO 2007134320 A2 * | 11/2007 | ............ H01M 2/105 |
| WO | WO2007134320 A2 | 11/2007 | |
| WO | WO2008035873 A1 | 3/2008 | |
| WO | WO 2008035873 A1 * | 3/2008 | .......... H01M 2/1077 |
| WO | WO2011060096 A2 | 5/2011 | |
| WO | WO2011060096 A3 | 5/2011 | |
| WO | WO2011121755 A1 | 10/2011 | |
| WO | WO2011163306 A2 | 12/2011 | |
| WO | WO2012008244 A1 | 1/2012 | |
| WO | WO2012009281 A1 | 1/2012 | |

OTHER PUBLICATIONS

International Search Report and Written Opinion for application No. PCT/EP2013/054194, dated Oct. 2, 2013, 11 pages.
International Preliminary Report on Patentability, dated Mar. 1, 2013, 12 pages—Translated.
German Examination Report, dated Nov. 5, 2012, 5 pages—Translated.

* cited by examiner

SUPPLY NETWORK COMPONENT FOR A SUPPLY NETWORK

CROSS-REFERENCE TO RELATED APPLICATIONS

This is a Continuation application of International patent application PCT/EP2013/054194, filed Mar. 1, 2013, which claims the priority of German patent application DE 10 2012 101 800.6, filed Mar. 2, 2012.

BACKGROUND OF THE INVENTION

The present invention relates to a supply network component for a supply network for a network medium. In particular, the present invention relates to an energy supply network for supplying more consumers with electrical energy. In particular, the supply network component can in this case be an energy store, an energy converter or an energy source or else an energy consumer.

Rechargeable batteries as energy stores and as energy sources in voltage networks for supplying consumers with electrical energy are generally known. Conventional energy stores include alkaline batteries, for example, of standardized housing sizes such as, for instance, Micro(AAA), Mignon(AA), Baby(C), Mono(D), which in each case provide a voltage of 1.5 volts, or else block batteries having a voltage of 9 volts or flat-pack batteries having a voltage of 4.5 volts. There likewise exists rechargeable variants of these energy stores on the basis of nickel/cadmium (NiCd) or nickel/metal hybrid (NiMh) or on the basis of lithium.

Such batteries can then be adapted to a specific application with regard to the operating voltage by series connection. In the case of known automobile and motorcycle batteries as well, for the respective connections and designs there are some standardized forms which allow a user to choose between different manufacturers and qualities. These batteries also allow the user or the specialist himself/herself to carry out a battery change. A designer and developer in the case of these batteries can build on a global standard which allows service support all around the world. For cylindrical rechargeable cells there is a large choice of chargers, charging stations and applications.

This is not the case, however, for rechargeable lithium batteries. In most cases, the batteries have to be specifically adapted to the application and to the charging system. On account of the increased safety requirements and the hazard potential for the user in the case of fire, this type of battery is no longer simple and uncomplicated in terms of handling. Parallel and/or series connection without complex controls is not possible. Limit values predefined by a manufacturer often have to be taken into account. Any overload can lead to the failure of a cell or even to uncontrolled fires. Consequently, it is customary nowadays to design and construct for each application a dedicated adapted battery system with an adapted charging system.

The requirements made of the quality of an individual battery increases in the case of relatively large battery arrangements and correspondingly high battery voltages, since, in the case of a series interconnection of batteries or cells, each individual cell must be functional. If a cell can no longer transport a current, is fully charged or discharged, the entire arrangement has to be switched off. Therefore, such a battery arrangement is always defined by the weakest and strongest cells. Thus, the quality requirements made of the individual cells are extremely stringent. The battery lifetime is intended to be correspondingly long. In the case of laptops and cellular phones, the lifetime of the device is expected to be two years. A technology is then generally deemed to be obsolete. This means a reasonable lifecycle for the battery or cell used. Moreover, the value share of the battery is not dominant; the failure thereof and the procurement of replacement parts are noncritical. The same applies to lead-acid batteries in motorcycles and automobiles. Multiple exchange during the lifetime is routine practice here. The automobile battery is statistically the most frequent cause of breakdowns in the passenger vehicle and motorcycle sectors. Similar approaches for the lifetime are unacceptable for electrical mobility.

In any cell pack it is necessary to keep each individual cell in the same state of charge. In the case of lead-acid, NiCd and NiMh this is produced by overcharging the battery, which results in heating of the full cells, but is possible within limits. This is not allowed for lithium-ion cells, or that is to say that some types of cells, as soon as they are fully charged, acquire high impedance and no longer take up current. Therefore, it is important to match the cells among one another by means of additional circuits. In order to obtain a harmoniously cooperating cell pack, the production process usually involves checking and sorting each individual cell, in order to use only cells of identical type in a cell pack. In order that uniform aging arises in a pack, it is important to keep all the cells at the same temperature level, which is difficult to achieve in the case of large arrangements or distributed batteries in a vehicle.

Usually, within a cell pack, if there are individual defective cells, they can be changed mechanically only with difficulty or not at all. Furthermore, it is normally found that, if old and new cells are connected in series, the pack reacts homogeneously only for a short time. As a result, repair by changing individual defective cells of interconnected packs is not recommendable and is therefore not practiced either.

Especially for mobile applications and vehicles it is of interest to meet the user's requirements by means of the chemical composition and the internal construction of the battery. Price, continuous and peak power, energy content, safety, charging time, lifetime and use temperature can be shifted by means of the chemical composition or variation of the stipulated limit values.

In the case of electric bicycles, in the meantime there are many combinations of chargers and batteries which function only as a closed unit. In this case, a direct-current connection is often used as plug connector. In this case, it is not possible to prevent chargers for e.g. 36-volt batteries from being connected to 24-volt batteries.

The end of the lifetime of a battery is defined nowadays such that it is reached as soon as the battery has only a residual capacity of approximately 70-80% of its original capacity. In this case, the possible charging and discharging capacity of a battery decreases linearly as the number of cycles increases. It can thus happen that a battery having a residual capacity of 80% is to be disposed of. Secondary further use of these batteries is desirable.

In the case of electric vehicles, the proportion of costs for batteries is disproportionately high. Therefore, it would be desirable to have only the storage capacity that is actually required. Refilling or rapid exchange of the batteries is also a desirable criterion. Especially in the case of cars and buses there are models which enable complete exchange of the battery block. However, the formation of a standard is an undertaking that is difficult to realize, owing to the different battery geometries and the different sizes.

The so-called "EnergyBus" standard on the basis of the standard of CANopen (Controller Area Network) forms the basis for the control and communication of intelligent electricity network components in the mobile application. Load regulation is distributed among a plurality of bus subscribers and it is absolutely necessary to define an unambiguous master for the energy management. The number of batteries is limited here. The data connection is created in bus form as a CAN bus. The routing of the electricity cannot be comprehended unambiguously.

A combination of batteries having different capacities is described in the document WO 2012 009281 A1. The document WO 2012 008244 A1 discloses a use of two rechargeable batteries connected in parallel. Furthermore, the document WO 2011 163306 A2 discloses a possibilities for balancing large electric vehicle batteries. The document EP 2 343 752 A3 discloses a battery having a cylindrical housing form. The document WO 2011 121755 A1 discloses the possibility of employing used rechargeable battery cells by measuring and combining new appropriate cell pairings. The document WO 2011 060096 A3 proposes an automatic parallelization of battery packs. The document DE 10 2008 050437 A1 discloses a scalable automobile battery. The document DE 10 2006 055883 B4 discloses a modular system for energy converters and energy stores. The document DE 19615943 A1 discloses a solar system composed of standard parts. The document DE 10 2010 027854 A1 discloses alternate charging and discharging of rechargeable batteries. The document DE 10 2010 023049 A1 discloses a modular system for batteries for optimized maintenance tasks. The document US 2011 0163603 A1 discloses a hybrid, centrally controlled energy supply. The document DE 10 2006 043831 A1 discloses a battery system composed of partial batteries connected via bidirectional direct current converters. The document DE 10 2006 047654 A1 discloses an automatic battery changing station for cars.

The present-day large multi-cell battery systems exhibit a number of fundamental problems. As a result of a high number of cells, the probability of a failure increases linearly with the number of cells connected in series. In most cases of a cell defect, the entire battery unit has to be replaced, which results in high costs.

In the case of the battery concepts such as are currently used in the case of cars, a high operating voltage arises which has to be correspondingly safeguarded by means of appropriate insulation monitorings even in the case of an accident. Repairs on batteries are normally not possible even for specialist workshops. The customer normally has to enter into a supply relationship for the energy store with the application manufacturer and cannot have recourse to a second alternative. As a result, no competition can arise. Especially in the case of lithium, every product or vehicle gives rise to an independent battery design which cannot readily be scaled and applied to other applications. The development time and tests often have to be undergone again in the event of design changes. Battery exchange stations can arise appropriately only for individual vehicle and battery types.

The potential risk of danger increases with the size of the battery pack. Lithium batteries are always deemed to be hazardous material. There are currently three limits in Germany. Everything below 100 Wh is transportable without any problems even in aircraft. Lithium batteries including packaging which weigh more than 5 kg are not permitted to be transported together with persons in aircraft. Batteries above 35 kg cannot be transported as air freight.

In most applications, the charger and the battery form an inseparable combination. That is to say that the limit values for the charge and the regulation thereof are implemented by the charger. If confusion arises here between this pairing, uncontrolled overcharging often results in fires that are difficult to extinguish on account of the lithium.

The required mechanical stability of a battery pack correspondingly increases with increasing size and is not easily manageable in accident situations.

In the case of an application with fixedly installed batteries, a period of time of up to three years can elapse between the production of the device and the first use by the customer. In the case of most battery systems, this means failure as a result of deep discharge. Consequently, charging has to be carried out regularly during storage. It would therefore be advantageous for the application and the batteries to be stored and supplied separately, in order to be able to supervise the storage time of the batteries.

A large number of manufacturers that are concerned with the production of lithium cells and assemble the latter, and also users and transport companies are exposed to the constant hazard of a fire. In this context, vehicle manufacturers, warehouses, garages, ferries, ships and aircraft have also been damaged or destroyed in the past. Battery packs that have mechanical damage prove to be extremely hazardous in this context. In the case of lithium cells, a fire can suddenly break out even after weeks. Particularly tiny short circuits within individual cells owing to contaminants that arose during production initiate fires here even after years of use. In the case of necessary recall actions it is often not possible to trace where the individual batteries have gone.

Large battery packs can be constructed nowadays only with homogeneously identical measured individual cells. The quality demands for the individual cell and a homogeneous temperature distribution in the pack are the basis for long-lived operation. Solutions for exchanging individual cells or partial regions do not exist.

BRIEF SUMMARY OF THE INVENTION

Therefore, it is an object of the present invention to provide a supply network component which can be used in a mobile and flexible manner and is suitable in particular for use in a scalable supply network.

According to an aspect of the invention, there is provided a supply network component for a supply network for a network medium, comprising at least one contact unit for contacting further supply network components of the supply network, a functional group having at least one functional unit, and at least one coupling unit for coupling the at least one contact unit to the functional group, wherein the at least one contact unit has a communication interface for communicating with a further supply network component of the supply network and a transport interface for transporting the network medium to a further supply network component.

According to a further aspect of the invention, there is provided an energy storage block for a supply network for a network medium, wherein the energy storage block comprises a plurality of supply network components for a supply network for a network medium, each supply network component comprising at least one contact unit for contacting a further supply network component of the supply network, a functional group having at least one functional unit, and at least one coupling unit for coupling the at least one contact unit to the functional group, wherein the at least one contact unit has a communication interface for communicating with a further supply network component of the supply network and a transport interface for transporting the network medium to a further supply network component, wherein the plurality of supply network components are connected in parallel and/or in series with one another.

In particular, the network medium is electrical energy. However, water, gas, air, petroleum, thermal energy or other energy forms can also be involved, for example.

In particular, the at least one functional unit is an energy store or a store of the network medium. However, this can also be, for example, a source or a consumer or a converter or a conductor of the network medium, in particular an energy consumer, an energy source, an energy converter or an energy conductor, in particular for electrical energy.

Furthermore, an energy storage block of a supply network for a network medium is proposed, wherein the energy storage block comprises a plurality of the supply network components proposed above which are connected in parallel and/or in series with one another.

In this way, it becomes possible to provide, as supply network component, a mobile, stackable, secure and intelligent standard energy store as a component of an intelligent electricity network or energy mesh in which the energy consumers, the energy sources and the energy stores as supply network components according to the invention can communicate via suitable interfaces and protocols and the current flow and data flow between the supply network components can be routed unambiguously. Furthermore, autonomous and independent load regulation is possible in each case. A data and information network set up in parallel with the network medium can communicate in particular jointly via identical contact units.

The typical size of such a supply network component as standard energy store on the basis of lithium can expediently be adapted to the transport and hazardous material regulations explained and to the regulations for exposed low voltage. Two expedient pack sizes arise as a result. Firstly a pack size of 100 Wh with a weight of less than 1 kg and secondly with a weight of up to 5 kg with outer packaging.

The operating voltage should range within the low voltage of 48 V battery rated voltage and a peak voltage of 60 V. Since, for the same power with high voltage, the current correspondingly decreases, the voltage of the energy transmission should be chosen to be as high as possible.

The functional units used in the supply network component should in turn correspond as far as possible to a known structural size from the cell manufacturers. Here the cylindrical type 18650 having a diameter of 18 mm with a length of 65 mm is a widespread standard size. A cell of the type 18650 has approximately 7 to 8 Wh. In the case of 12 cells and a cell weight of approximately 500-800 g, an energy store would have a total capacity of approximately 84 to 96 Wh. Also conceivable as an alternative is an individual cell solution having 3.6 V and 27 Ah and having a direct current converter, which then converts the 3.6 V to 48 V.

In a manner similar to the standardized alkaline batteries and the mobile data and cellphone networks, a mobile, pluggable standard form of the supply network component enables equalization between energy supplier, device manufacturer, applications, owner, network operator and user, which in this case gives rise to advantageous competition with high quantities of items. The scalability makes it possible to enable battery systems of from 100 Wh to ranges with several megawatt-hours with identical storage elements.

The supply network component as energy store is arbitrarily interchangeable between different applications. At home or in businesses, variable buffer stores can arise in conjunction with other supply network components in the form of energy sources such as solar installations and other electricity sources, which can then in each case also be used for the vehicle fleet by means of an exchange process. The individual energy stores are permitted to be distributed, and can be distributed, arbitrarily in the application and form a shared intelligent electricity network. A tree structure can be used to form different blocks which can be linked into superordinate structures without any problems. For companies and fleet operators there can be a universal "standard rechargeable battery" for uninterruptible power supply, electrical traction applications, emergency lighting, vehicle fleet, wheelchairs, mobile garden implements and cordless hand tools.

Large amounts of energy stores such as at exchange stations, for example, can charge/store energy in the case of low network load and can feed part of it in again in the case of peak load and can thus be used as storage power plants.

However, in domestic use, too, it is conceivable to use the store for other applications or to have mobile energy. With a direct current(DC)/alternating current(AC) converter, any device operated by electricity can be turned into a cordless device as a supply network component. These include, for example, vacuum cleaners, hand tools, mixers, stirring devices, music systems, amplifiers, electronic instruments, measuring instruments, coffee machine, water boilers, irons and computers.

A further major field of application is camping and boat equipment. In this case, by means of solar installations and wind turbines as supply network components, energy can be collected and fed directly into the electricity network.

Service vehicles for rescue services, police and military are becoming more and more dependent on mobile electricity and use many rechargeable battery-operated aids which can be used more flexibly and more systematically by means of a uniform application-dependently scalable rechargeable battery system. Mobile electricity in road construction for optical warning with flashing lamps or mobile traffic light installations could also have recourse here to a uniform energy store. The housings of the intelligent standard energy stores can also be equipped with other energy stores and rechargeable battery systems and are therefore future-proof. Separable packing sizes arise which are safely transportable even in air traffic. A large energy store consists only of small units which can be safely touched, serviced and put into operation. In the event of accidents or insulation damage, the arising of dangerous high voltage is virtually precluded. The repair of an energy store by the user or a specialist workshop becomes possible without any problems. The size, structure and weight enable the housings to be designed as stable units.

Any mechanical movement can be combined with electromagnetic converters/generators without much outlay to form the energy collector in connection with the battery. Small wind turbines, water wheels with corresponding generators can be used in a simple manner to collect energy from the environment simply and locally at the generator and to store it.

Battery-operated devices, by virtue of the standard form, can also be offered and sold to the customer without a battery and charging system. Filling the tower of a wind power installation with containers equipped with a plurality of supply network components allows these stores then to be realized at sizes in the MWh range and to be operated at the same time as an exchange station.

In one refinementrefinement of the supply network component, it can be provided that the coupling unit has a controlling device for controlling the functional group.

In the case where the one or the plurality of functional units of the functional group is or are an energy store, such a controlling device can for example function as an energy manager and implement specific charging and discharging strategies.

As charging and/or discharging strategy for parallel-connected functional units designed as energy stores, two methods are available for selection, for example.

Firstly, during charging and discharging, it is possible to switch back and forth between the individual functional units. As a result, the capacity can be increased, but the retrievable power decreases.

Secondly, it can be provided that the functional units designed as energy stores are interconnected in parallel with the same voltage level. This matching is achieved by virtue of the fact that, during discharging, the energy store having the highest voltage is switched on and discharged until it has reached the voltage level of the energy store having the second highest voltage level. In this way, the energy stores are turned on in order until the internal pack voltage and the electricity network voltage have the same level. During charging, this process can take place in exactly the opposite way. As soon as such an arrangement has been matched and remains together, the voltage level usually remains the same during charging and discharging. This common charging and discharging is possible even with packs of different ages. Old energy stores usually have a higher internal resistance. In the event of sudden load changes, the better energy store is then subjected to higher loading and the older or weaker energy store to correspondingly lower loading. In this way, even totally different chemical types can be combined during the discharging. Combinations of lithium and NiMh have proved worthwhile here. Energy stores having different capacities also permit a combination here.

Correspondingly, the controlling device can be designed in such a way that it can perform at least one of the methods explained above.

In one refinement of the supply network component, it can be provided that the at least one contact unit furthermore has an auxiliary voltage interface for transmitting an auxiliary voltage for supplying the contact unit and/or the coupling unit with electrical energy.

The auxiliary voltage is available, in particular, to microcontrollers in the supply network component which enable communication before the network medium is turned on.

In one refinement of the supply network component, it can be provided that the transport interface transmits the electrical energy in the form of a direct current.

In order to enable load regulation as in the case of conventional power plant management, it is proposed, in the case of electrical energy as network medium, to construct a DC voltage network between the supply network components and to use voltage regulation in the network as load regulation.

In one refinement of the supply network component, it can be provided that the functional group has twelve functional units each designed as a lithium cell.

A homogeneous temperature distribution and the necessary balancing of the cells in such systems than relate only to the e.g. 12 common cells within a housing. Packs distributed over the application are permitted to have other temperatures without correspondingly mutually influencing one another. Correspondingly, even large arrangements of packs can be correspondingly air-conditioned by means of simple ventilation of the application. Overheating can be effected by correspondingly optimum temperature regulation of replacement batteries in the charging stations.

In one refinement of the supply network component, it can be provided that the functional group has at least one direct current converter.

In the charging and discharging strategies explained in relation to the controlling device, the battery determines the voltage level in the electricity network. Instead of a switch, it is possible to provide a direct current converter (DC/DC converter) in the supply network component, which converter enables both a voltage increase and a decrease between the functional units and a system voltage at the at least one contact unit and for this purpose, in a manner similar to a laboratory power supply unit, an adjustable voltage and current limit for both current directions. This allows an exact energy distribution, regulation and limitation of each individual supply network component. It would thus be conceivable to make an energy consumer such as a vehicle, for example, usable again by exchanging only 10% of discharged supply network components for fully charged supply network components.

The integration of the direct current converter makes it possible to carry out simple adaptation and also to adapt an individual supply network component to the operating voltage of the electricity network. For instance from 3.6 V to 48 V in the example of the single-cell solution described above. The balancing between the individual supply network components would thus be obviated.

If the supply network has a connection between a supply network component as energy store and a supply network component as energy source or energy converter, e.g. a solar generator, the direct current converter can in this case perform the power optimization and maximum power tracking (MPT), i.e. the regulation of that current and that voltage for which the highest power can be drawn from the solar generator. Expedient combinations between different solar cell sizes and energy stores are easily conceivable without complex cabling and high installation outlay.

In one refinement of the supply network component, it can be provided that the functional group has a plurality of functional units each designed as an energy store, wherein a respective direct current converter is assigned to each energy store.

The balancing between the individual functional units of the functional group of the supply network component could ultimately be obviated in this way. Consequently, high flexibility is then provided even at the level of the functional units.

In one refinement of the supply network component, it can be provided that the supply network component comprises at least one switch for separating the functional group from the network medium.

Each supply network component can thus autonomously interrupt the current flow through at least one switch in one or both directions.

Each supply network component designed as an energy store will only supply energy if a release is given via the communication interface. In this case, after authentication, identification of compatibility and compliance with the physical limits, each supply network component is individually turned on or off.

Each supply network component can thus take responsibility for safe connection to the supply network by means of the communication interface and by monitoring compatibility with the supply network present.

In one refinement of the supply network component, it can be provided that the supply network component comprises at least one sensor for detecting a physical parameter of the functional group, in particular wherein the parameter is a voltage, a current or a temperature of the at least one functional unit.

Each supply network component can thus monitor all safety-relevant physical parameters itself and thereby safeguards a user. In particular, voltage, current and temperature are to be monitored and, in particular by the controlling device, to be limited. Via the communication interface, all required technical data and physical parameters can be exchanged electronically between supply network components.

On the basis of the collected measurement data of each subscriber, each contact unit can determine for example the instantaneously flowing current and provide for limiting. In addition, it is conceivable to measure the temperature of the contact unit in the vicinity of the contacts in order thus to determine and report defective, contaminated or poorly connected connections at the high-current plugs and, if possible, to correspondingly reduce these paths in the current.

In one refinement of the supply network component, it can be provided that the supply network component comprises at least one sensor for detecting an ambient temperature of the supply network component or an acceleration of the supply network component.

By means of built-in temperature and acceleration sensors, the supply network component can identify and signal problems in an anticipatory manner. If appropriate, transmission of the network medium via the transport interface can then be interrupted. In particular, a shock sensor can thus be provided in order to identify the possible occurrence of damage.

In one refinement of the supply network component, it can be provided that the at least one contact unit is connected to the functional group by means of at least one permanent magnet.

In this way, simple connection of the contact units can be provided, which is easily releasable again by a holding force of the permanent magnet being overcome. Furthermore, no special orientation is required to close the connection, particularly if the permanent magnet is arranged rotationally symmetrically in the contact unit. Alternatively, however, the at least one contact unit can also be screwed to the functional group or fixedly connected in some other way. The proposed connection by means of at least one permanent magnet can then be provided in order to connect the supply network components or the respective at least one contact unit of two supply network components to one another.

In one refinement of the supply network component, it can be provided that the communication interface and/or the transport interface are/is designed in a rotationally symmetrical fashion.

This enables a connection of two contact units, without a user having to take account of an orientation of the contact units.

In one refinement of the supply network component, it can be provided that the transport interface of one of the at least one contact unit is provided using spring contact pins.

In the case where the network medium is electrical energy, for example, this enables the network medium to be transmitted safely via the transport interface.

In one refinement of the supply network component, it can be provided that the transport interface of one of the at least one contact unit is provided by means of two ring-shaped, coaxial contacts.

By way of example, a coaxial form with three contacts can be chosen for the contact unit. Two of said contacts are ring-shaped contacts which have a high-current capability and can permanently transmit up to 60 A and thus constitute "plus and minus" of the supply network with electrical energy as network medium.

In one refinement of the supply network component, it can be provided that the transport interface of the at least one contact unit has insulating webs between individual contacts.

This can contribute to enabling safe transmission via the transport interface with short circuits being avoided. In particular, it can furthermore be provided that the insulating webs project outwardly beyond the contacts. In this way, a user can be effectively prevented from inadvertently touching the contacts. This precludes endangerment of the user and inadvertent bridging or short-circuiting of the contacts on account of the touching.

In one refinement of the supply network component, it can be provided that the auxiliary voltage interface is designed in a coaxial fashion with respect to the transport interface.

A third contact can serve as auxiliary voltage. It is at 12 V and up to 2 A in order to be available, inter alia, to the microcontrollers in the network which enable communication before the network voltage is turned on.

In one refinement of the supply network component, it can be provided that the communication interface is a wireless communication interface.

In this case, in one refinement of the supply network component, it can be provided that the communication interface is an RFID communication interface.

RFID communication is chosen for data transmission between intelligent electricity network components. During transport, sorting and storage of supply network components, this enables communication and locating without contact-making processes. However, RFID technology also makes it possible to correspondingly transmit data from completely discharged batteries or passive subscribers such as key systems without additional batteries, as a result of which large quantities of intelligent electricity network subscribers can be managed clearly.

In one refinement of the supply network component, it can be provided that the supply network component comprises an at least partly rewritable memory.

Each supply network component can a certain readable and partly writable memory area and thereby enables each device to be unambiguously identified. In this regard, on an electronic basis, all required product data can be introduced into an electronic nameplate.

By means of a central database, items of information such as, for example, the number of charging cycles, the technical state or the present user can be determined and updated during each charging process. This should technically make it possible to recall them if they should be transferred to less demanding applications in a manner governed by performance or they are due for recycling. In this case, rental, hire, selling models can then be implemented on the basis of an online valuation of the energy store.

In one refinement of the supply network component, it can be provided that the supply network component comprises at least one partial element of an antitheft protection system.

A corresponding mount e.g. on a bicycle can enable the supply network component to be safeguarded by means of a locking mechanism or a lock system in a mechanical or electromechanical manner. Corresponding other supply network component can also be protected by such a lock system.

In one refinement of the supply network component, it can be provided that the supply network component comprises at least one first and one second contact unit, wherein the first contact unit is designed in the form of a plug and the second contact unit is designed in the form of a socket.

A contact unit is provided which enables rapid coupling and separation of individual housings among one another. In the example, the cylindrical form was chosen, which in terms of design is also intended to be reminiscent of the symbolism of existing battery standards. In a manner similar to a cylindrical alkaline battery, contact is made by two contact units at two cylinder ends, the base surface and the top surface of the cylinder. These two contact blocks can be pressed against one another magnetically or mechanically for secure plug-in.

From the corner data mentioned above, it is possible to define a design for a supply network component in which the energy stores, the energy sources and the energy consumers are then optionally combined among one another by plugs and cables but also by individual contact units being simply plugged together. In this regard, by way of example, it is possible to plug an AC/DC converter (power supply unit) with one or a plurality of batteries in series and charging can begin.

Other energy stores, energy sources or energy consumers can also be installed in the housing of the intelligent standard energy store or in a manner equipped with the contact units of the intelligent electricity network. In this regard, in the same design, a power supply unit (AC/DC converter) can also feed in energy or be produced by a cross-connection to a direct current converter with respect to the 12 V standard of an automobile.

The two contact units of the supply network component designed as an energy store are connected to busbars within the housing, which simultaneously perform supporting functions. In this case, the design of the internal construction should be realized such that highly automated manufacture is possible and it protects the accommodated cells as efficiently as possible against mechanical influences from outside.

In one refinement of the supply network component, it can be provided that the supply network component comprises an identification unit, which unambiguously identifies the supply network component.

Unambiguous routing of the network medium is made possible in this way. Furthermore, this enables the supply network component to be individualized, with the result that an identification is possible over its entire lifecycle.

In one refinement of the supply network component, it can be provided that an assignment of the supply network component to a user group is stored in a memory of the supply network component.

Required information and safety functions would then be regulatable via RFID between the filling station, the user and the owner of the packs and implementable with corresponding server systems in exchange procedures which can be managed by central accounting. Forms of accounting such as in the case of returnable bottle systems or mobile radio accounting can be instituted here.

Semiautomatic exchangeable stores at home can temporarily store the electricity harvested in wind or solar installations and transfer this energy to the vehicles in the household by means of a rechargeable battery exchange. A corresponding charging station can then of course also be used as emergency power supply in a simple manner. In this case, bundling in storage systems, in a manner similar to that in the case of returnable bottle systems, is also conceivable.

In one refinement of the supply network component, it can be provided that the controlling device is designed in such a way that it separates the functional group from the network medium in the event of a failure of the communication interface.

Defective or unsuitable supply network components are thus simply disconnected from the supply network. As a result, by way of example, a vehicle even with a large number of defective batteries and cells can still remain usable.

In one refinement of the supply network component, it can be provided that the supply network component comprises a housing having substantially a cylindrical form, wherein the supply network component comprises a first and a second contact unit, wherein the latter respectively form a base surface and a top surface of the cylinder.

The proposed cylindrical form for the supply network component as an energy store, with automated transport systems and transport pipes, permits the production of a simple shared filling and removal opening on vehicles, which enables the "battery change", in a manner similar to a refilling operation, in a few minutes.

For the use of a plurality of supply components in an energy block, various application possibilities are conceivable. In this case, a plurality of supply network components as energy stores can of course also be combined to form energy storage blocks whose design is not cylindrical.

Large electric tools such as power saws, lawnmowers, hammer drills, handheld circular saws, etc. can be operated with a supply network component (100 Wh) designed as an energy store. An electric bicycle, for example, can be moved with three of such supply network components (300 Wh). Ten supply network components could drive a two-wheel vehicle at a speed of 25 km/h. An electric four-wheel vehicle could already be operated with one hundred supply network component (10 kW) designed as energy stores. With contact-connections and converter units, approximately 700 supply network components designed as energy stores or 70 kWh could be accommodated on a so-called Euro-pallet having dimensions of 80×120×100 cm. In a container having the dimensions of a 40-foot ocean container, 40 of the Euro-pallets and thus approximately 2800 kWh could be accommodated and charged as peak current stores by solar installations and wind generators.

An expedient combination of supply network components connected in parallel and in series makes it possible to influence structural spaces, costs, weight; energy capacity and performance. By virtue of this arrangement, however, it is also conceivable, in a vehicle, for a storage space such as, for example, the trunk or seats optionally to be filled with energy stores or load to be conveyed.

Consequently, it is open to the user himself/herself to determine primarily weight, transport volume, power and quality of energy and to vary them for the respective purpose of use. Each supply network component designed as an energy store, by means of two contact units, enables extension without a high degree of additional outlay. Of course, it is also conceivable for supply network components designed as energy stores to be safely removed from an automobile, for example, for an electric bicycle or the lawnmower. Two to three supply network components, with appropriate adaptation, can replace the conventional 12 V automobile battery in the case of internal combustion engine vehicles without problems and, if necessary, can be exchanged by a lay person in next to no time.

Furthermore, it can be provided that the elements controlling and controlling the supply network component or elements of the supply network component, e.g. the controlling device, are designed as rewritable or freely programmable circuits which can be updated by means of a firmware update via the communication interface. In this case, the firmware update can be written, for example, to the supply network component from a remote further supply network component.

It goes without saying that the features mentioned above and those yet to be explained below can be used not only in the combination respectively specified, but also in other combinations or by themselves, without departing from the scope of the present invention.

BRIEF DESCRIPTION OF THE SEVERAL VIEWS OF THE DRAWING

Embodiments of the invention are illustrated in the drawing and are explained in greater detail in the following description. In the figures.

DETAILED DESCRIPTION OF THE INVENTION

Figure 1:
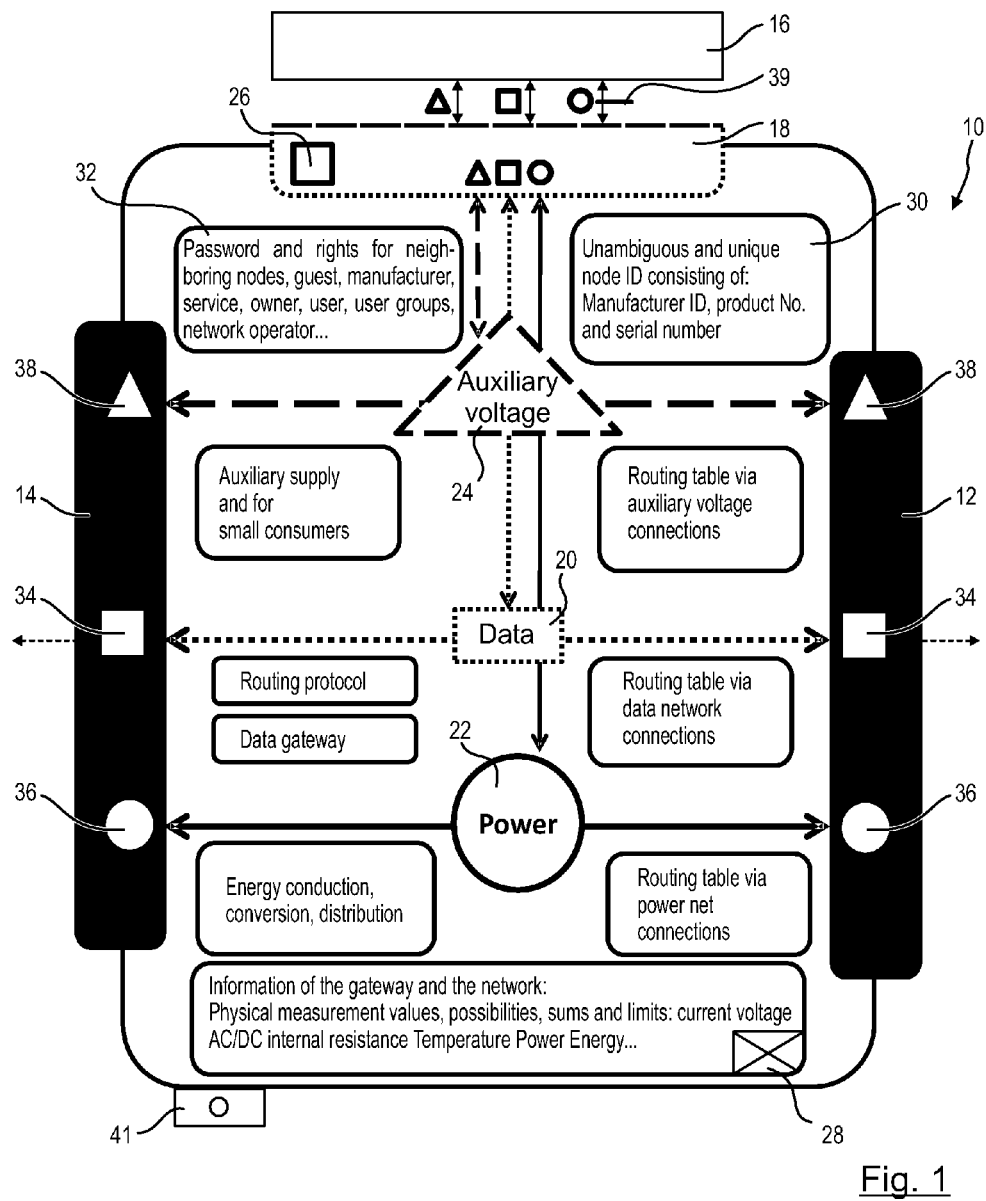
FIG. 1 shows a schematic embodiment of a supply network component.

FIG. 1 shows a supply network component 10 in a schematic illustration. The supply network component 10 comprises a first contact unit 12 and a second contact unit 14. By means of the first contact unit 12 and the second contact unit 14, the supply network component 10 can be connected to other supply network components. The supply network components connected to one another in this way then form a supply network. The supply network can comprise gas, water, petroleum, etc. as network medium. The network medium is electrical energy in the following examples.

The function of a respective supply network component is determined by its functional group 16. The functional group 16 can be configured for example as energy store, energy converter, energy source or as energy consumer. The functional group 16 is connected in each case to the first contact unit 12 and a second contact unit 14 by means of a coupling unit 18, which can also be referred to as a gateway.

In this case, in the embodiment illustrated, three networks are set up in parallel with one another. These include firstly the so-called "Power Mesh" 22, which is provided for transporting the network medium, the electrical energy. Furthermore, a data mesh 20 necessarily exists in parallel with the power mesh 22. The data mesh 20 serves for the communication of the supply network components 10 among one another. Furthermore, in the embodiment illustrated, an auxiliary voltage mesh 24 is present, which is likewise set up in parallel with the data mesh 20 and the power mesh 22. However, the auxiliary voltage mesh 24 need not necessarily be present. The auxiliary voltage mesh 24 is provided, however, in the present embodiment. It serves for supplying electrical components of the supply network component with electrical energy. These may be, in particular, the coupling unit 18 and possibly components of the first contact unit 12 and of the second contact unit 14. In this way, it can then be ensured, for example, that the supply network component 10 is compatible with further supply network components of the supply network and the network medium or the electrical energy is then transmitted only if compatibility has been classified as present.

A controlling device 26 is provided in the coupling unit 18. The controlling device 26 serves for controlling the functional group 16. In this case, the arrangement of the controlling device 26 in the coupling unit 18 should be understood to be merely by way of example: it can also be arranged physically within the functional group 16. In the exemplary embodiments illustrated below, the functional group 16 is an energy store. In this respect, the controlling device 26 can be designed to charge or discharge the functional group 16.

Furthermore, the supply network component comprises an identification unit 30. The identification unit 30 carries in itself an unambiguous identification of the supply network component 10. This serves for unambiguously identifying the respective supply network component 10 within the supply network which enables unambiguous routing within the three networks 20, 22, 24. Furthermore, the supply network component 10 can comprise an at least partly writable memory 32. In the latter, the supply network component 10 can be allocated to a specific user and rights for access to the supply network component 10 for other users or other supply network components can be stipulated. In the memory 32 it is also possible to store other data about the state of the supply network component 10, for example a number of charging cycles which the controlling device 26 has performed.

Each of the contact units 12, 14 has a communication interface 34, which provides an interface for the data mesh 20 to a further contact unit. Furthermore, each of the contact units 12, 14 has a transport interface 36, which provides an interface for transmitting the network medium, electrical energy in the embodiment explained, in the power mesh 22. Furthermore, in the embodiment illustrated, each contact unit 12, 14 also has an auxiliary voltage interface 38, which serves for transmitting the auxiliary voltage within the auxiliary voltage mesh 24 to adjacent supply network components.

Furthermore, the supply network component 10 can comprise a switch 39. Said switch 39 can be automatically switchable by the supply network component 10. It serves to interrupt transmission of the network medium, electrical energy in the present embodiment, from and to the functional group 16. The functional group 16 can then no longer be charged and discharged, for instance. The switch 39 can be switched for example at by the controlling device 26. This enables the functional group 16 to be disconnected from the power mesh 22, for example in the case where the functional group 16 is no longer functional or has been classified as dangerous on account of specific instances of parameters being exceeded.

Such parameters can be detected by means of a sensor 28, for example. It goes without saying that it is also possible for more than one sensor 28 to be provided. The sensor 28 can detect arbitrary physical parameters of the supply network component 10, for example temperatures, powers, currents, voltages or resistances within the supply network component 10, in particular within the functional group 16.

The transport interface 36 and the auxiliary voltage interface 38 can be embodied in a wired fashion, in principle. The communication interface 34 can be embodied in a wired or wireless fashion. In particular, capacitive, inductive or optical transmission can also take place via the communication interface 34. In particular, however, it is provided that the communication interface 34 communicates with adjacent supply network components 10 by means of RFID techniques. This enables, in particular, galvanic isolation of the data mesh 20 from the power mesh 22 and the auxiliary voltage mesh 24.

Furthermore, the supply network component 10 can comprise at least one partial element 41 of an antitheft protection system that can prevent the supply network component 10 from being stolen during operation.

Figure 2:
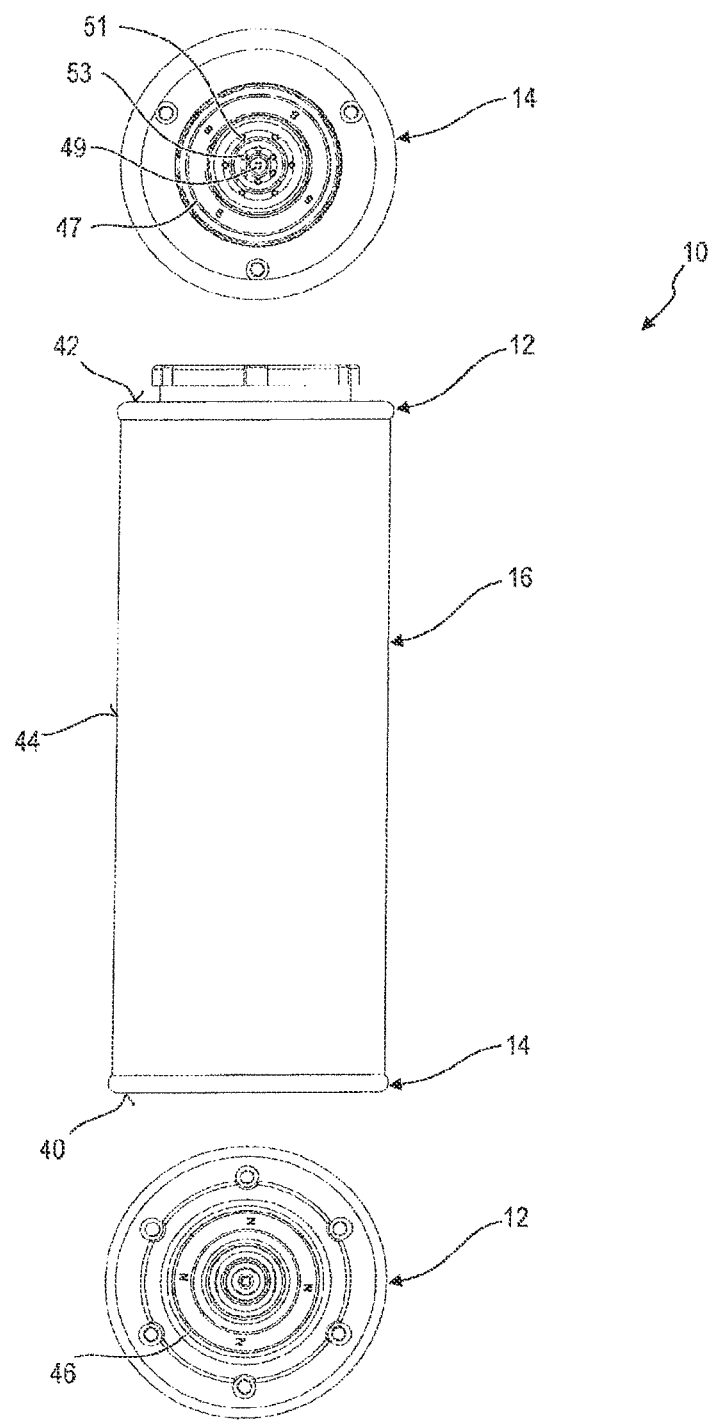
FIG. 2 shows a further embodiment of a supply network component designed as an energy store.

FIG. 2 shows a schematic view of a supply network component 10 designed as an energy store. Identical elements are identified by identical reference signs and will not be described again. The supply network component 10 has a cylindrical outer form. The cylinder is delimited by a base surface 40, a top surface 42 and a lateral surface 44. The base surface 40, the top surface 42 and the lateral surface 44 thus form a housing of the cylinder or of the supply network component 10.

The lateral surface 44 can be provided in an exchangeable fashion, for example; in this way, the lateral surface 44 can be configured in different colors, for example, depending on which user uses the supply network component 10.

The first contact unit 12 and the second contact unit 14 close as it were the functional group 16 enveloped by the lateral surface 44, said functional group being designed as an energy store, at the base surface 40 and the top surface 42 of the cylinder. For this purpose, the first contact unit 12 has a permanent magnet 46 and the second contact unit 14 has a permanent magnet 47. By means of these permanent magnets 46, 47, the contact units 12, 14 can be fitted to the functional group 16. However, it can also be provided that the contact units 14, 16 are in each case screwed to the functional group 16 or are fixedly connected to the functional group in some other way. Alternatively or cumulatively in relation thereto, the permanent magnets 46, 47 serve to interconnect the supply network components 10, and to protect the plug connections or contact connections explained below. In this regard, the supply network components 10 can be separated from one another without damage by means of a bending movement. In particular, this fitting, on the basis of a ring-shaped configuration of the permanent magnets 46, 47, can be effected in an arbitrary orientation of the contact units 12, 14. Furthermore, the contact units 12, 14 can be released again from the functional group 16 in a simple manner by the holding force of the permanent magnets 46, 47 being overcome, for example by a respective contact unit 12, 14 being bent away from the functional group 16. In the embodiment illustrated, the contact units 12, 14 are designed according to the plug/socket principle. This will be explained in greater detail below. In particular, the second contact unit 14 has at least three spring contacts. A spring contact 49 for the auxiliary voltage is formed centrally, the spring contact forming the auxiliary voltage interface 38. Furthermore, spring contacts 51, 53 are formed, wherein the spring contact 51 carries a positive voltage and ground is present at the spring contact 53. The spring contacts 51, 53 form the transport interface 26 of the second contact unit 14. In this case, the spring contact 49 and also both the spring contact 51 and the spring contact 53 can in each case be designed as spring contact groups, wherein a spring contact group has a plurality of individual spring contacts. The power that can then be transmitted via a spring contact group can be increased in this way.

Figure 3:
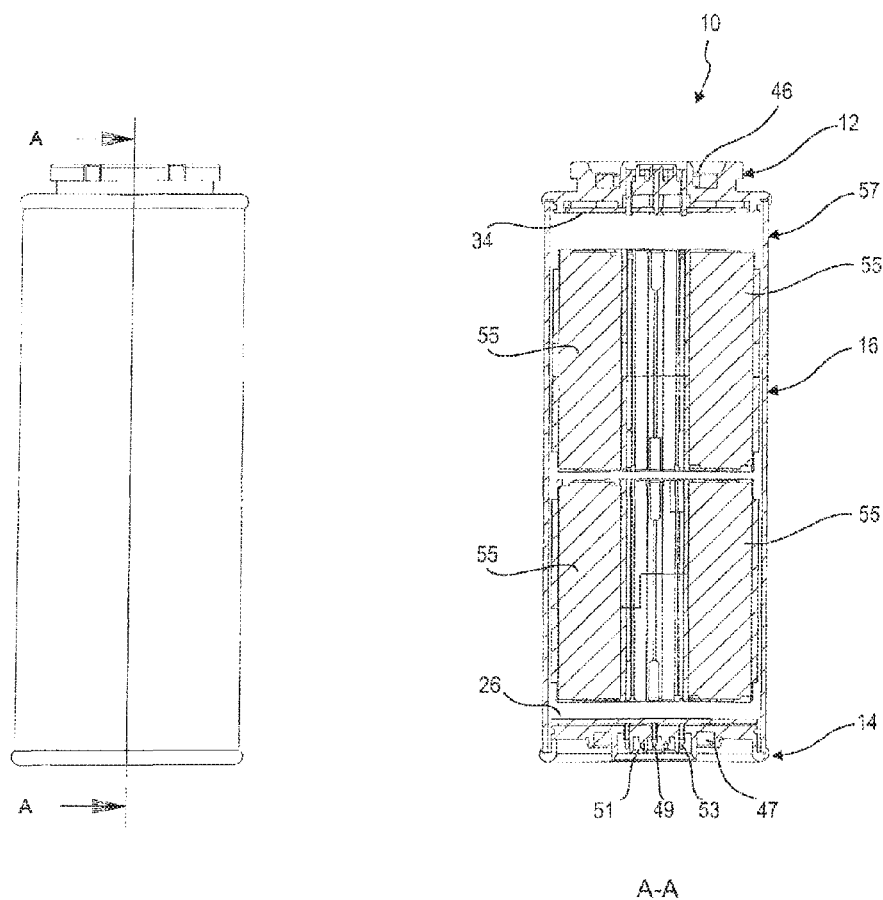
FIG. 3 shows a schematic cross-sectional view of the supply network component in FIG. 2.

FIG. 3 shows a cross-sectional view along a sectional line A-A of the supply network component 10. Identical elements are identified by identical reference signs and will not be explained again.

Within the functional group 16, the supply network component 10 comprises a plurality of functional units 55. Each of the functional units 55 is designed as a rechargeable lithium-ion cell which is able to take up and store electrical energy and to output it again as required. The functional units 55 are surrounded by a sheath element 57, which forms the lateral surface 44. As has already been explained above, the sheath element 57 is exchangeable, in principle, such that an external esthetic impression of the supply network component 10 can be varied arbitrarily. In principle, longitudinal webs (not illustrated) can be provided between the first contact unit 12 and the second contact unit 14, said longitudinal webs extending parallel to the lateral surface 57 and enabling current to be directly passed through from the first contact unit 12 to the second contact unit 14, and vice versa, without electrical energy or current having to pass through the functional units 55.

Furthermore, the supply network component 10 comprises the communication interface 34 at the first contact unit 12 and the controlling device 26 at the second contact unit 14. It goes without saying that the controlling device 26 and the communication interface 34 can also be arranged the other way round. Furthermore, it can be provided that each of the contact units 12, 14 has both a controlling unit 26 and a communication interface 34. The communication interface 34 is designed by means of RFID technology, in particular an active RFID transponder, to enable communication with other supply network components 10.

Figure 4:
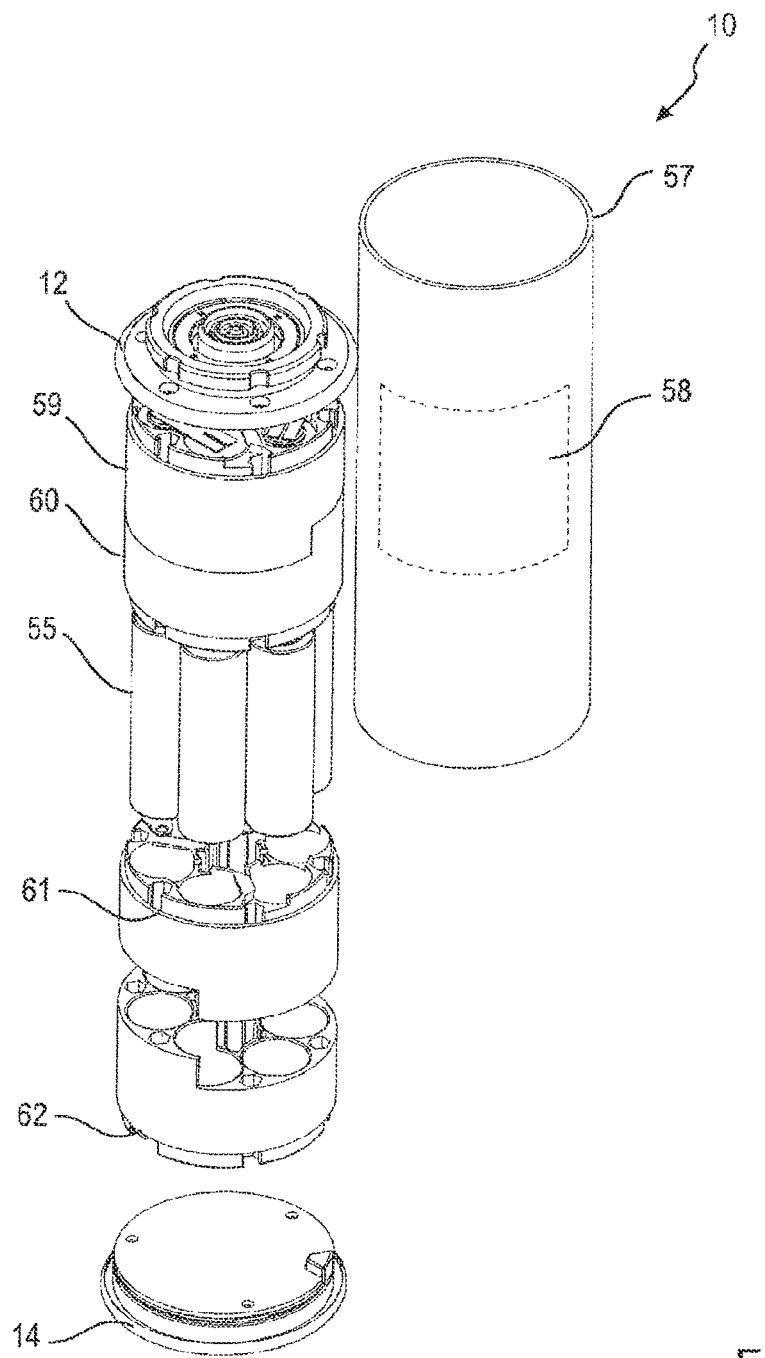
FIG. 4 shows an isometric exploded view of the supply network component in FIG. 2.

FIG. 4 shows the supply network component 10 in an isometric exploded view. Identical elements are once again identified by identical reference signs and will not be explained again.

The supply network component 10 is delimited toward the outside by the sheath element 57 and the contact units 12, 14. However, the functional units 55 are not arranged loosely in the sheath element 57, but rather are surrounded by a plurality of holding elements 59 to 62 which hold the functional elements fixedly within the sheath element 57. This enables a robust construction of the supply network component 10, which simplifies the transport and storage thereof.

Figure 5:
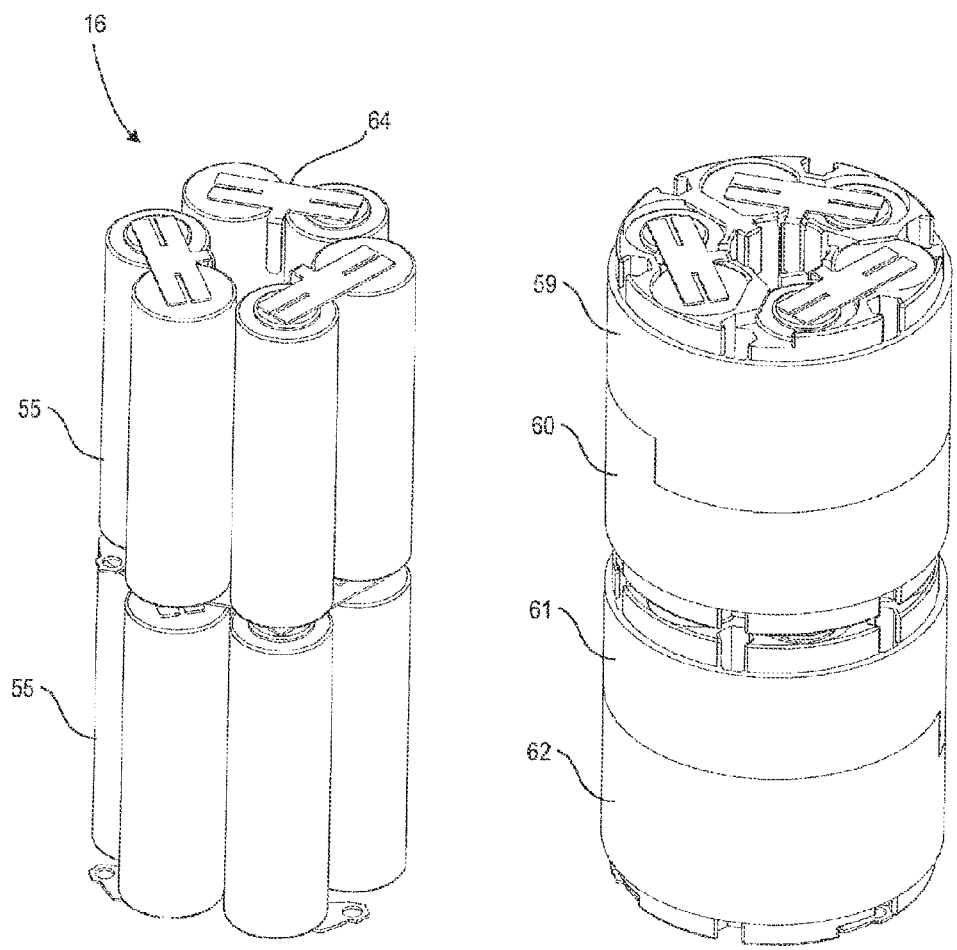
FIG. 5 shows a view of the functional units of the supply network component in FIG. 2.

FIG. 5 shows a partly assembled view illustrating the functional units 55 in greater detail.

Overall, the functional group 16 of the supply network component 10 has twelve functional units 55. The latter are connected to one another, in particular connected in series with one another, by connecting webs 64. In principle, of course, other series connections and/or parallel connections are also conceivable in order to provide a desired voltage/capacity ratio of the functional groups 55.

As is illustrated, the functional units 55 are then held in the holding elements 59 to 62, thus resulting in a compact cylindrical construction of the functional group 16 and thus of the supply network component 10.

Figures 6A, 6B:
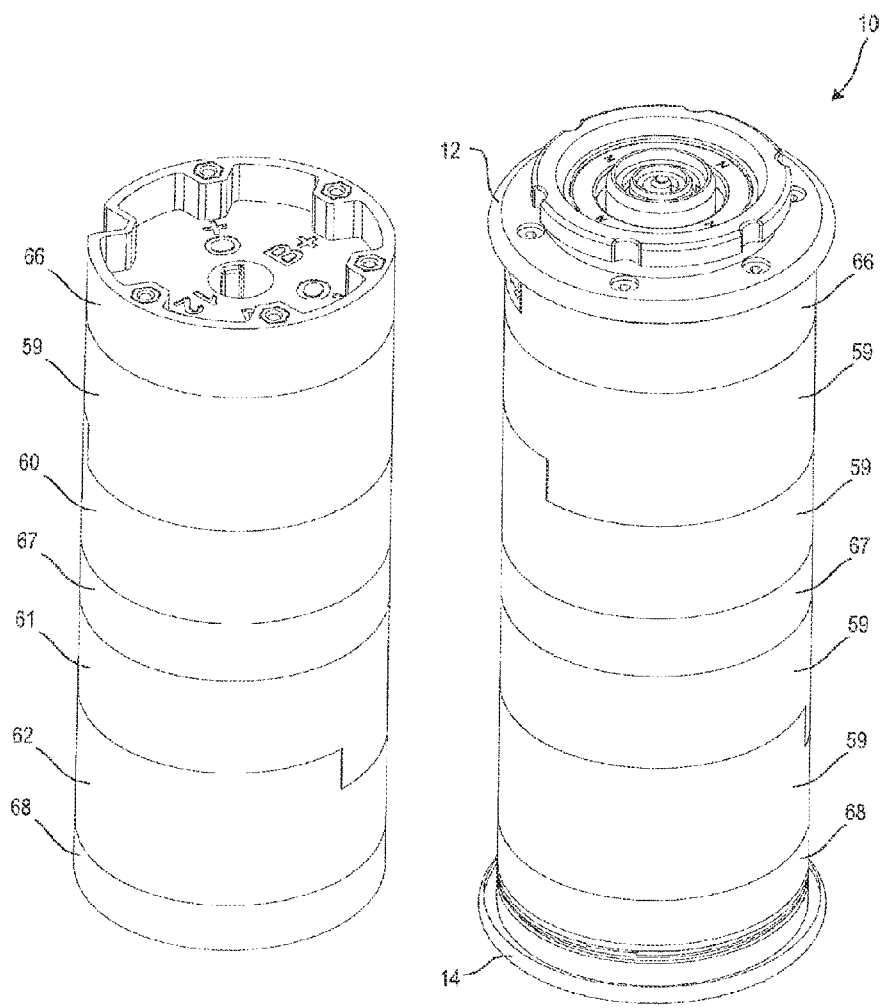
FIG. 6a shows a partly assembled view of the supply network component in FIG. 2.
FIG. 6b shows an isometric assembled view of the supply network component in FIG. 2.

FIG. 6a illustrates a further partial assembly of the supply network component 10. The combined holding elements 59 to 62 hold the functional units 55. Furthermore, insulation elements 66, 67, 68 are provided in order to avoid short circuits, said insulation elements insulating the functional units 55 from one another and the functional group from the contact units 12, 14.

FIG. 6b illustrates the supply network component 10 in the assembled state with omission of the sheath element 57. In principle, the supply network component 10 is already usable in this way. The sheath element 57 then merely shields the supply network component 10 toward the outside and provides an esthetic impression that can be influenced arbitrarily. Furthermore, the sheath element 57 and its connections to adjoining elements can be configured in a watertight fashion in order to protect the inner functional group 16. Furthermore, the sheath element 57 can have a display device 58 indicated by a dashed line. Said display device can display for example parameters of the functional group 16, for instance a state of charge, to a user. The display device can be a so-called "E-paper", in particular. The E-paper can form the entire lateral surface. The E-paper can be, for example, a display device composed of LCD components, in particular ChLCD (Cholesteric Liquid Crystal Display) components. It can also be provided that a display device can be connected to the supply network component 10 for displaying information via a plug connection or one or more of the spring contacts, e.g. via the communication interface.

Figure 7:
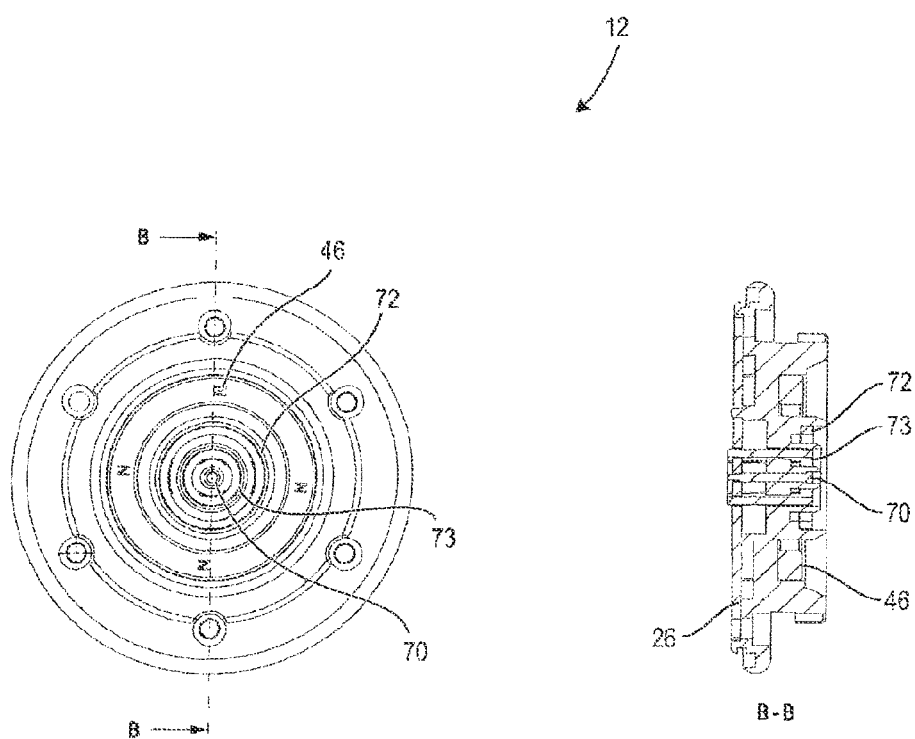
FIG. 7 shows a first embodiment of a contact unit, which can form a first contact unit of the supply network component in FIG. 2.

FIG. 7 shows a detailed view of the first contact unit 12. Identical elements are once again identified by identical reference signs and will not be explained again. The first contact unit 12 is designed as a "socket". Accordingly, it has a mating contact 70, which forms the auxiliary voltage interface 38 in the first contact unit 12. Said contact can serve for contacting a contact unit designed as a "plug", such as the second contact unit 14, for example.

Furthermore, the first contact unit 12 has two rings 72 and 73, which serve as a transport interface 36 of the first contact unit 12. In this case, one ring is occupied by ground. The rings can thus make contact with the corresponding spring contacts 51, 53 of a contact unit designed as "plug". By virtue of the design as rings, furthermore, it is not necessary to comply with a specific orientation for producing a connection between two contact units 12, 14.

Figure 8:
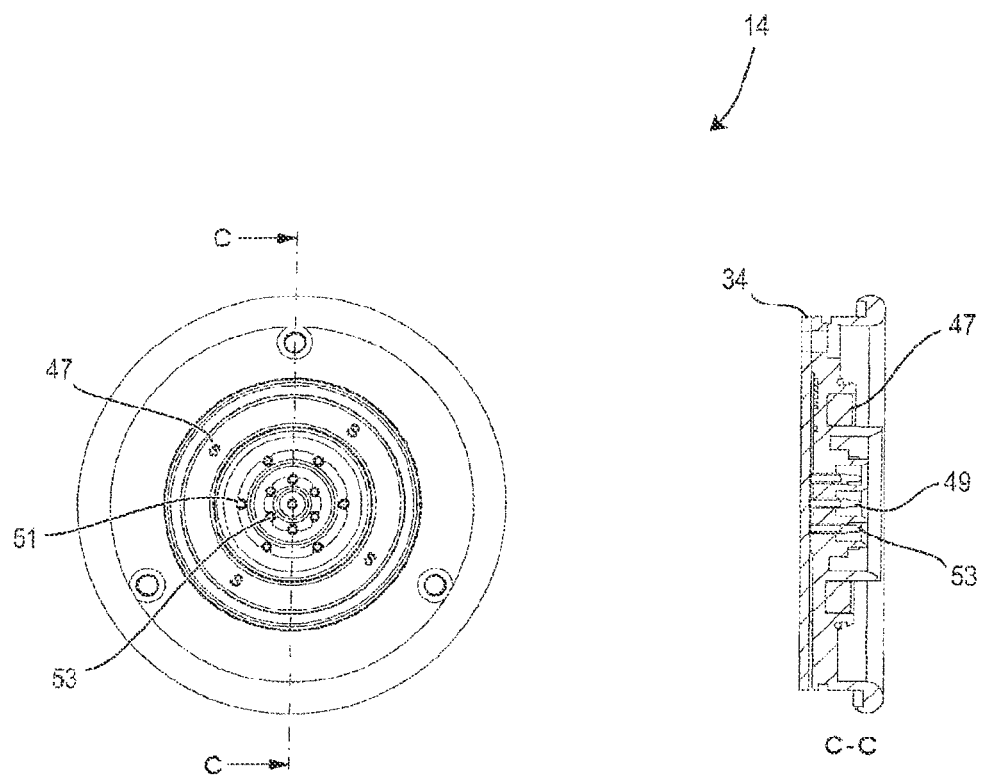
FIG. 8 shows a second embodiment of a contact unit, which can form a second contact unit in the supply network component in FIG. 2.

FIG. 8 illustrates a detail view of the second contact unit 14 designed as a "plug". Accordingly, a contact unit designed in the manner of the second contact unit 14 can easily be connected to a contact unit designed in the manner of the first contact unit 12. Corresponding elements are identified by the known reference signs and will not be explained again.

Furthermore, both in the case of the first contact unit 12 and in the case of the second contact unit 14 it can be provided that they are provided with cables in order, besides the standard interfaces 34, 36, 38 illustrated in FIGS. 7 and 8, to provide a connection to other functional groups, for example energy sources or energy stores according to other standards, for instance automobile batteries.

Figure 9:
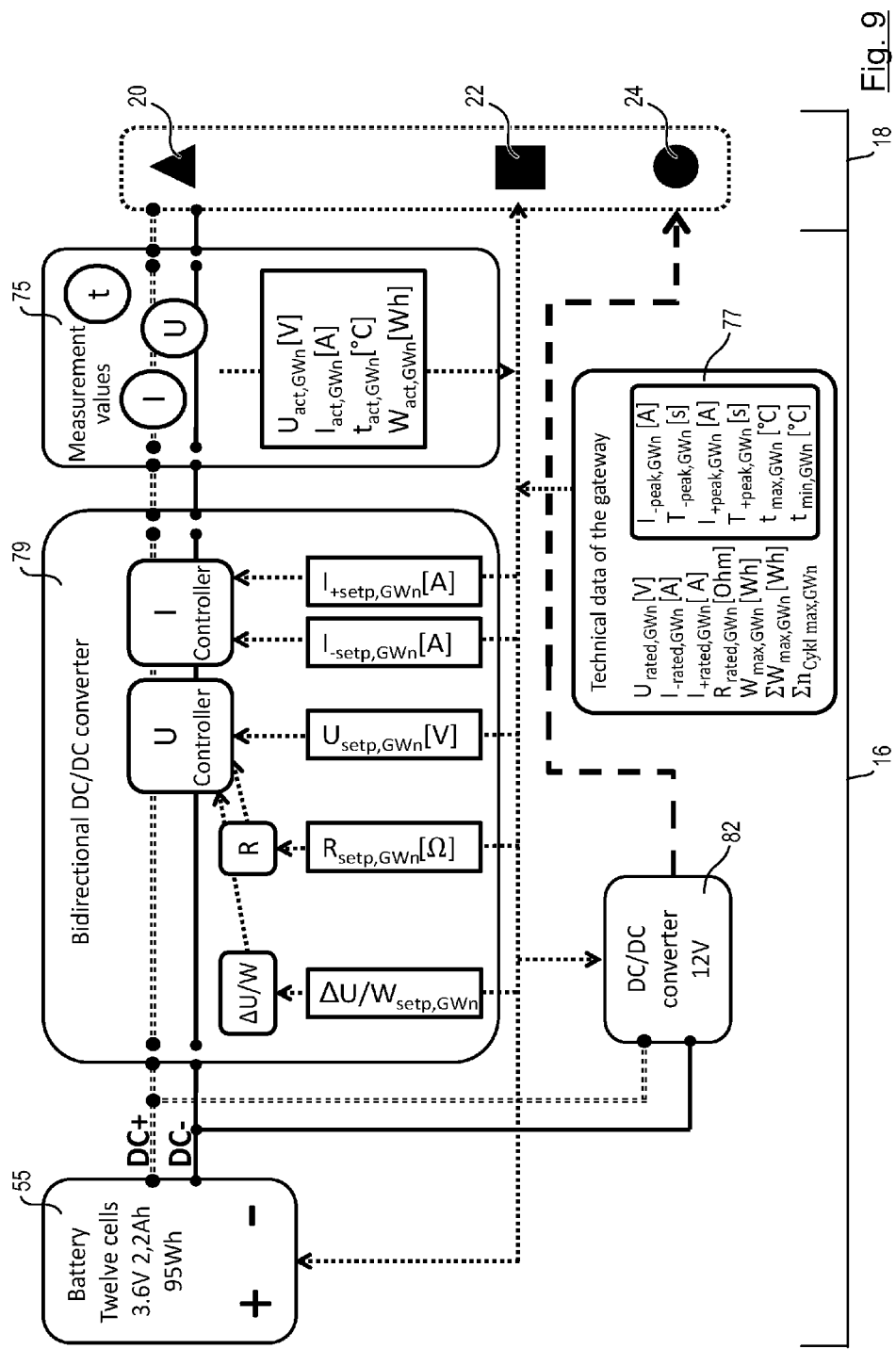
FIG. 9 shows a schematic view of the design of a functional group.

FIG. 9 illustrates one example of a functional group 16 with a coupling unit 18. The coupling unit 18 has contact for the data mesh 20, the power mesh 22 and the auxiliary voltage mesh 24. Furthermore, the functional group 16 has twelve functional units 55, as described above.

The abbreviations indicated in FIG. 9 have the following meanings: "setp" stands for a setpoint value, "act" stands for an actual value, "GWn" denotes an index for the coupling unit 18, U stands for a voltage, I stands for a current, R stands for a resistance, W stands for watts, "rated" stands for rated values, "max" stands for maximum values, "min" stands for minimum values, t stands for a temperature, T stands for a time, "peak" stands for a peak value, n, stands for a number of charging or discharging cycles. The units indicated correspond to the customary SI system.

As already described in the introductory part of the description, the functional group 16 can have a bidirectional direct current converter 79, which regulates a charging and discharging process of the functional unit 55. The corresponding signal profiles are illustrated in FIG. 9. Parameters that predefine boundary conditions can be stored in a data set 77 in the supply network component 10 or in the functional group 16 and are thus available to the bidirectional direct current converter 79. Furthermore, a second direct current converter 82 is provided, which provides the auxiliary voltage at the auxiliary voltage interface 38 for the auxiliary voltage mesh.

Furthermore, sensors 75 are arranged in the functional group 16, said sensors measuring actual values within the functional group 16. These measurement values can be forwarded within the data mesh 20 or evaluated within the supply network component 10. By way of example, if one of these measurement values reaches a critical value, the switch 39 can be actuated.

Figure 10:
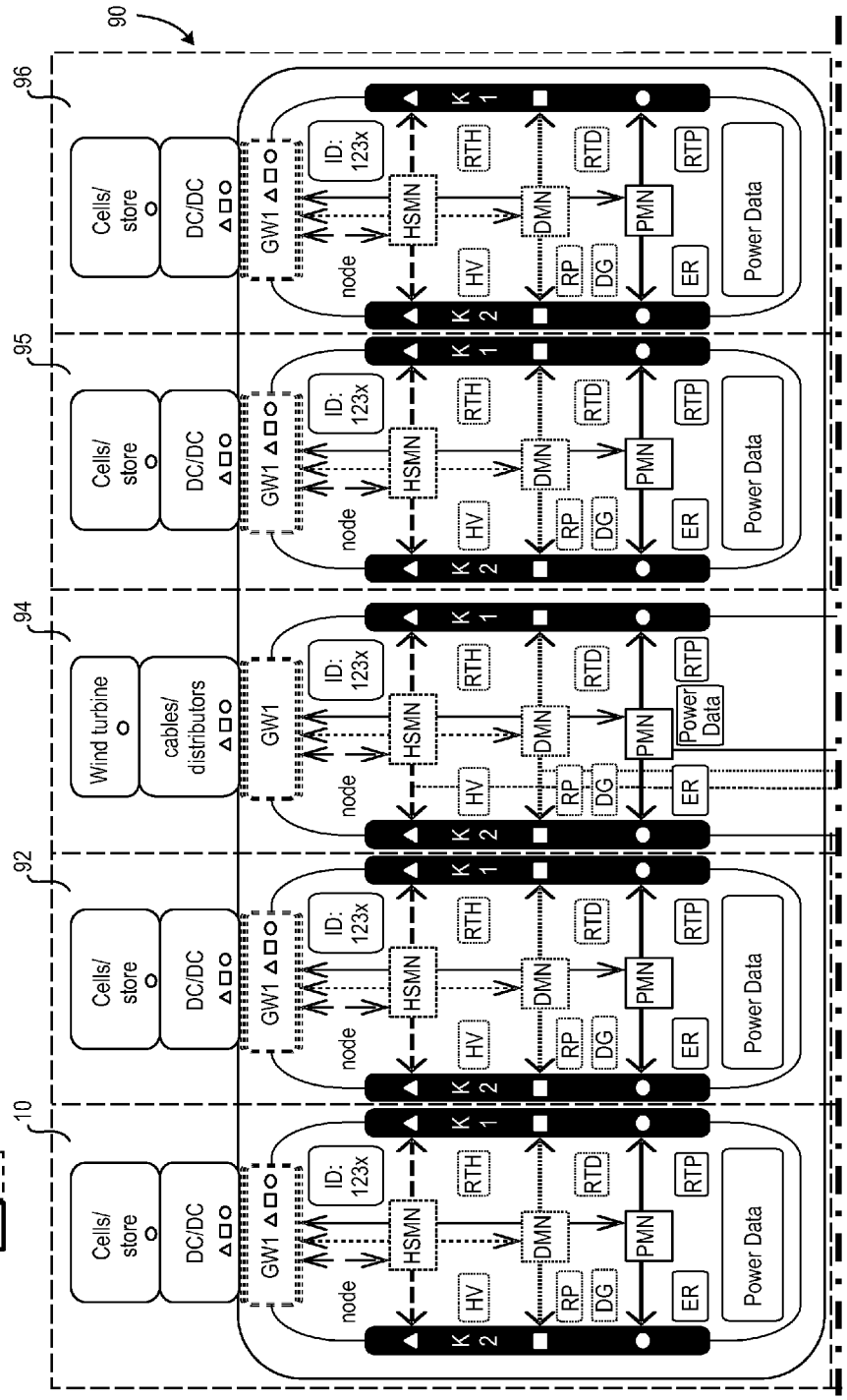
FIG. 10 shows a schematic view of a supply network comprising a plurality of supply network components.
Figure 10:
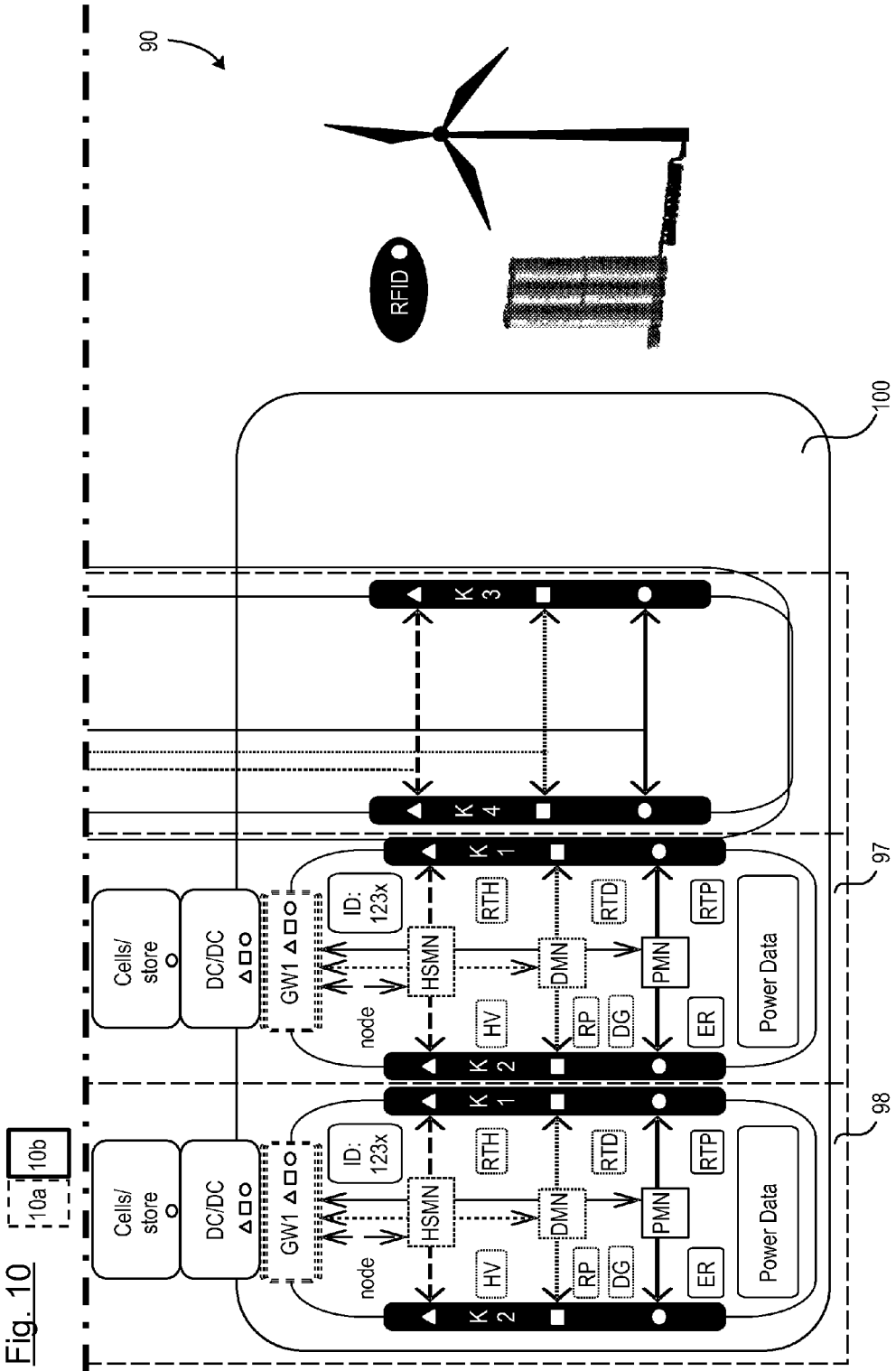

FIG. 10 illustrates by way of example a supply network 90 comprising a plurality of supply network components 10, 92, 94, 95, 96, 97 and 98. In this case, the supply network 90 is explained on the basis of the example of a wind power installation. Accordingly, the supply network 90 comprises a supply network component 94 designed as an energy source. The supply network component 94 correspondingly comprises four contact units and the wind turbine as a functional group, wherein the functional group furthermore has cables and distributors for linking the wind turbine within the power mesh 22 to its four contact points. In each case two above-described supply network components 10, 92, 95, 96, 97, 98 designed as energy stores are connected to three of the four contact points of the supply network component 94. The power mesh 22 can thus be operated in direct-current operation. Each of the supply network components 10, 92, 94, 95, 96, 97, 98 designed as energy stores comprises within its functional group a dedicated direct current converter which can regulate the charging and discharging individually for the respective functional group of each supply network component 10, 92, 95, 96, 97, 98. Consequently, balancing of the individual supply network components 10, 92, 95, 96, 97, 98 is no longer necessary. In this way, a large energy store for temporarily storing the energy provided by the energy source 94 can be made available in a particularly simple manner. Furthermore, an open continuation 100 of the supply network 90 is illustrated schematically; further supply network components, for example consumers, can then be connected here.

Figure 11:
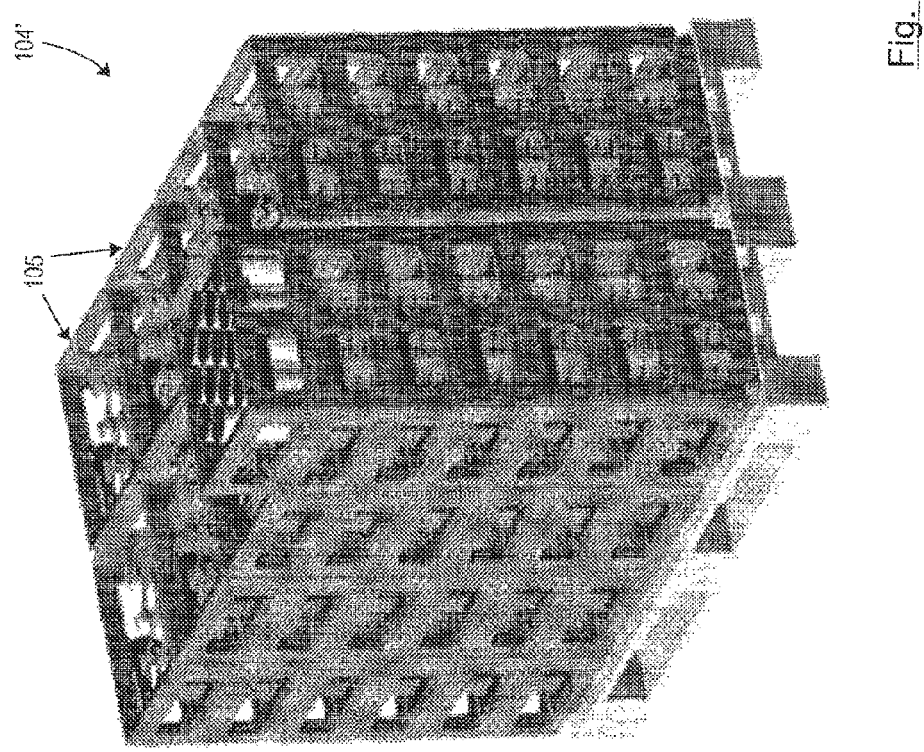
FIG. 11 shows embodiments of an energy storage block.
Figure 11:
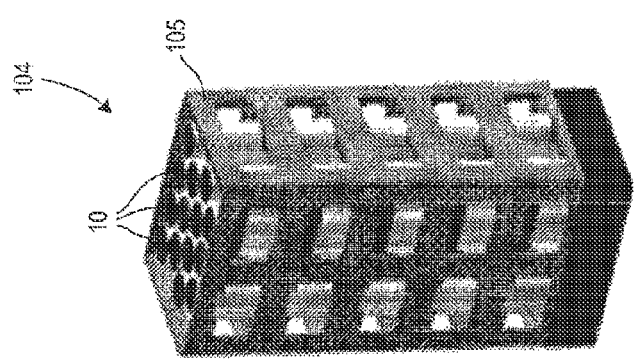

FIG. 11 schematically illustrates embodiments of an energy storage block 104.

The supply network component 10 defined as an energy store, as explained in FIGS. 2 to 8, can be interconnected together with further supply network components of identical design to form an energy storage block 104. For this purpose, pack connectors 105 can be provided, which are designed in the manner of crates in the present case. A plurality of supply network components 10 can be arranged therein, which are then automatically connected to one another in series and/or in parallel. The pack connectors 105 can in turn be interconnected in series and/or in parallel. Scalable energy stores can be provided in this way. In this regard, it is also possible to provide energy stores having large capacities of more than one megawatt-hour which are suitable as peak current stores for example in wind power installations, as explained above in FIG. 10. In this case, on account of the uniformly configured contact units 12, 14, the energy stores can be connected to one another and to the pack connectors 105 in a simple manner.

Furthermore, the current disclosure comprises embodiments according to the following clauses:

Clause 1. A supply network component for a supply network for a network medium, comprising at least one contact unit for contacting a further supply network component of the supply network, a functional group having at least one functional unit, and at least one coupling unit for coupling the at least one contact unit to the functional group, wherein the at least one contact unit has a communication interface for communicating with a further supply network component of the supply network and a transport interface for transporting the network medium to a further supply network component.

Clause 2. The supply network component according to clause 1, wherein the network medium is electrical energy.

Clause 3. The supply network component according to clause 1 or 2, wherein the at least one functional unit is an energy store.

Clause 4. The supply network component according to any of clauses 1 to 3, wherein the coupling unit has a controlling device for controlling the functional group.

Clause 5. The supply network component according to any of clauses 1 to 4, wherein the at least one contact unit furthermore has an auxiliary voltage interface for transmitting an auxiliary voltage for supplying the contact unit and/or the coupling unit with electrical energy.

Clause 6. The supply network component according to any of clauses 2 to 5, wherein the transport interface transmits the electrical energy in the form of a direct current.

Clause 7. The supply network component according to any of clauses 2 to 6, wherein the functional group has twelve functional units each designed as a lithium cell.

Clause 8. The supply network component according to any of clauses 2 to 7, wherein the functional group has at least one direct current converter.

Clause 9. The supply network component as claimed in claim 8, wherein the functional group has a plurality of functional units each designed as an energy store, wherein a respective direct current converter is assigned to each energy store.

Clause 10. The supply network component according to any of clauses 1 to 9, wherein the supply network component comprises at least one switch for separating the functional group from the network medium.

Clause 11. The supply network component according to any of clauses 1 to 10, wherein the supply network component comprises at least one sensor for detecting a physical parameter of the functional group, in particular wherein the parameter is a voltage, a current or a temperature of the at least one functional unit.

Clause 12. The supply network component according to any of clauses 1 to 11, wherein the supply network component comprises at least one sensor for detecting an ambient temperature of the supply network component or an acceleration of the supply network component.

Clause 13. The supply network component according to any of clauses 1 to 12, wherein the at least one contact unit is connected to the functional group by means of at least one permanent magnet.

Clause 14. The supply network component according to any of clauses 1 to 13, wherein the communication interface and/or the transport interface are/is designed in a rotationally symmetrical fashion.

Clause 15. The supply network component according to any of clauses 2 to 14, wherein the transport interface of one of the at least one contact unit is provided using spring contact pins.

Clause 16. The supply network component according to any of clauses 2 to 15, wherein the transport interface of one of the at least one contact unit is provided by means of two ring-shaped, coaxial contacts.

Clause 17. The supply network component according to any of clauses 2 to 16, wherein the transport interface of the at least one contact unit has insulating webs between individual contacts.

Clause 18. The supply network component as claimed in claims 2 and 16, wherein the auxiliary voltage interface is designed in a coaxial fashion with respect to the transport interface.

Clause 19. The supply network component according to any of clauses 1 to 16, wherein the communication interface is a wireless communication interface.

Clause 20. The supply network component as claimed in claim 19, wherein the communication interface is an RFID communication interface.

Clause 21. The supply network component according to any of clauses 1 to 20, wherein the supply network component comprises an at least partly rewritable memory.

Clause 22. The supply network component according to any of clauses 1 to 21, wherein the supply network component comprises at least one partial element of an antitheft protection system.

Clause 23. The supply network component according to any of clauses 1 to 22, wherein the supply network component comprises at least one first and one second contact unit, wherein the first contact unit is designed in the form of a plug and the second contact unit is designed in the form of a socket.

Clause 24. The supply network component according to any of clauses 1 to 23, wherein the supply network component comprises an identification unit, which unambiguously identifies the supply network component.

Clause 25. The supply network component according to any of clauses 1 to 24, wherein an assignment of the supply network component to a user group is stored in a memory of the supply network component.

Clause 26. The supply network component according to any of clauses 4 to 25, wherein the controlling device is designed in such a way that it separates the functional group from the network medium in the event of a failure of the communication interface.

Clause 27. The supply network component according to any of clauses 1 to 26, wherein the supply network component comprises a housing having substantially a form of a cylinder, wherein the supply network component comprises a first and a second contact unit, wherein which form a base surface and a top surface of the cylinder, respectively.

Clause 28. An energy storage block for a supply network for a network medium, wherein the energy storage block comprises a plurality of supply network components for a supply network for a network medium, each supply network component comprising at least one contact unit for contacting a further supply network component of the supply network, a functional group having at least one functional unit, and at least one coupling unit for coupling the at least one contact unit to the functional group, wherein the at least one contact unit has a communication interface for communicating with a further supply network component of the supply network and a transport interface for transporting the network medium to a further supply network component, wherein the plurality of supply network components are connected in parallel and/or in series with one another.

What is claimed is:

1. An energy storing component for a supply network for electrical energy as a network medium, comprising:
    at least one contact unit for contacting a further energy storing component of the supply network;
    an energy store comprising at least one battery cell, and
    at least one gateway for coupling the at least one contact unit with the energy store,
    wherein the at least one contact unit has a communication interface for communicating with a further energy storing component of the supply network and a transport interface for transporting the electrical energy to the further energy storing component;
    wherein the energy storing component comprises at least one switch for separating the energy store from the network medium, the energy storing component being configured to cooperate with the communication interface such that the energy storing component is separated from the network medium in response to an autonomous identification of incompatibility of the energy storing component with the present supply network.

2. The energy storing component as claimed in claim 1, wherein the gateway has a controlling device for controlling the energy store.

3. The energy storing component as claimed in claim 1, wherein the at least one contact unit furthermore has an auxiliary voltage interface for transmitting an auxiliary voltage for supplying at least one of the contact unit or the gateway with electrical energy.

4. The energy storing component as claimed in claim 3, wherein the auxiliary voltage interface is designed in a coaxial fashion with respect to the transport interface.

5. The energy storing component as claimed in claim 1, wherein the transport interface transmits the electrical energy in the form of a direct current.

6. The energy storing component as claimed in claim 1, wherein the energy store has twelve functional units each designed as a lithium cell.

7. The energy storing component as claimed in claim 1, wherein the energy store has at least one direct current converter.

8. The energy storing component as claimed in claim 7, wherein the energy store has a plurality of energy stores, wherein a respective direct current converter is assigned to each energy store.

9. The energy storing component as claimed in claim 1, wherein the energy storing component comprises at least one sensor for detecting a physical parameter of the functional group.

10. The energy storing component as claimed in claim 9, wherein the parameter is a voltage, a current or a temperature of the at least one energy store.

11. The energy storing component as claimed in claim 1, wherein the energy storing component comprises at least one sensor for detecting an ambient temperature of the energy storing component or an acceleration of the energy storing component.

12. The energy storing component as claimed in claim 1, wherein the at least one contact unit is connected to the energy store by means of at least one permanent magnet.

13. The energy storing component as claimed in claim 1, wherein at least one of the communication interface or the transport interface is designed in a rotationally symmetrical fashion.

14. The energy storing component as claimed in claim 1, wherein the transport interface of one of the at least one contact unit is provided using spring contact pins.

15. The energy storing component as claimed in claim 1, wherein the transport interface of one of the at least one contact unit is provided by means of two ring-shaped, coaxial contacts.

16. The energy storing component as claimed in claim 1, wherein the transport interface of the at least one contact unit has insulating webs between individual contacts.

17. The energy storing component as claimed in claim 1, wherein the communication interface is a wireless communication interface.

18. The energy storing component as claimed in claim 17, wherein the communication interface is an RFID communication interface.

19. The energy storing component as claimed in claim 1, wherein the energy storing component comprises an at least partly rewritable memory.

20. The energy storing component as claimed in claim 1, wherein the energy storing component comprises at least one partial element of an antitheft protection system.

21. The energy storing component as claimed in claim 1, wherein the energy storing component comprises at least one first and one second contact unit, wherein the first contact unit is designed in the form of a plug and the second contact unit is designed in the form of a socket.

22. The energy storing component as claimed in claim 1, wherein the energy storing component comprises an identification unit, which unambiguously identifies the supply network component.

23. The energy storing component as claimed in claim 1, wherein an assignment of the energy storing component to a user group is stored in a memory of the energy storing component.

24. The energy storing component as claimed in claim 2, wherein the controlling device is designed in such a way that it separates the energy store from the network medium in the event of a failure of the communication interface.

25. The energy storing component as claimed in claim 1, wherein the energy storing component comprises a housing having substantially a form of a cylinder, wherein the energy storing component comprises a first and a second contact unit, wherein which form a base surface and a top surface of the cylinder, respectively.

26. The energy storing component as claimed in claim 1, wherein the energy storing component is configured to cooperate with the communication interface such that the energy storing component is switched on in response to an autonomous identification of compatibility of the energy storing component with the present supply network.

27. An energy storage block for a supply network for electrical energy as a network medium, wherein the energy storage block comprises:
    a plurality of energy storing components for a supply network for electrical energy as a network medium, each supply network component comprising:

at least one contact unit for contacting a further energy storing component of the supply network, an energy store comprising at least one battery cell, and at least one gateway for coupling the at least one contact unit with the energy store, wherein the at least one contact unit has a communication interface for communicating with a further energy storing component of the supply network and a transport interface for transporting the electrical energy to the further energy storing component, wherein the plurality of supply network components are connected in parallel or in series with one another;

wherein each of the energy storing components comprises at least one switch for separating its respective energy store from the network medium, each of the energy storing components being configured to cooperate with the communication interface such that the respective energy storing component is separated from the network medium in response to an autonomous identification of incompatibility of the respective energy storing component with the present supply network.

28. The energy storing block as claimed in claim 27, wherein each of the energy storing components are configured to cooperate with the communication interface such that the respective energy storing component is switched on in response to an autonomous identification of compatibility of the respective energy storing component with the present supply network.

\* \* \* \* \*